US008928681B1

(12) United States Patent
Edmondson et al.

(10) Patent No.: US 8,928,681 B1
(45) Date of Patent: Jan. 6, 2015

(54) COALESCING TO AVOID READ-MODIFY-WRITE DURING COMPRESSED DATA OPERATIONS

(75) Inventors: John H. Edmondson, Arlington, MA (US); Robert A. Alfieri, Chapel Hill, NC (US); Michael F. Harris, Raleigh, NC (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 279 days.

(21) Appl. No.: 12/649,204

(22) Filed: Dec. 29, 2009

Related U.S. Application Data

(62) Division of application No. 11/555,639, filed on Nov. 1, 2006.

(51) Int. Cl.
*G09G 5/36* (2006.01)

(52) U.S. Cl.
USPC ........... 345/547; 345/544; 345/545; 345/563; 345/549; 345/555; 711/117; 382/232; 382/233

(58) Field of Classification Search
USPC ................. 345/544–545, 563–574, 536–540, 345/549–555; 711/101–116, 147–153, 711, 711/117; 382/232–233
See application file for complete search history.

(56) References Cited

U.S. PATENT DOCUMENTS

| | | | |
|---|---|---|---|
| 5,852,443 A | 12/1998 | Kenworthy | |
| 6,029,226 A * | 2/2000 | Ellis et al. | 711/100 |
| 6,104,416 A | 8/2000 | McGuinness | |
| 6,415,054 B1 * | 7/2002 | Silverbrook et al. | 382/233 |
| 6,538,656 B1 * | 3/2003 | Cheung et al. | 345/519 |
| 6,580,427 B1 * | 6/2003 | Orenstein et al. | 345/422 |
| 6,907,499 B2 * | 6/2005 | Herbst et al. | 711/112 |
| 6,912,645 B2 | 6/2005 | Dorward et al. | |
| 6,961,057 B1 | 11/2005 | Van Dyke et al. | |
| 7,030,878 B2 * | 4/2006 | Xu et al. | 345/422 |
| 7,088,368 B1 * | 8/2006 | Andrews | 345/506 |
| 7,277,098 B2 * | 10/2007 | Xu et al. | 345/555 |
| 7,286,134 B1 * | 10/2007 | Van Dyke et al. | 345/544 |
| 7,505,036 B1 * | 3/2009 | Baldwin | 345/421 |
| 7,657,679 B2 * | 2/2010 | Chen et al. | 710/105 |
| 7,814,292 B2 * | 10/2010 | Tsien | 711/202 |
| 7,978,194 B2 * | 7/2011 | Seiler et al. | 345/422 |
| 2003/0018878 A1 | 1/2003 | Dorward et al. | |
| 2003/0079919 A1 | 5/2003 | Hochmuth et al. | |
| 2003/0145165 A1 * | 7/2003 | Herbst et al. | 711/112 |
| 2003/0234749 A1 | 12/2003 | Marks et al. | |
| 2005/0018917 A1 | 1/2005 | Brothers | |
| 2005/0024369 A1 * | 2/2005 | Xie | 345/547 |
| 2005/0041031 A1 * | 2/2005 | Diard | 345/505 |
| 2005/0206647 A1 * | 9/2005 | Xu et al. | 345/536 |
| 2006/0170693 A1 * | 8/2006 | Bethune et al. | 345/568 |
| 2006/0282645 A1 * | 12/2006 | Tsien | 711/207 |

OTHER PUBLICATIONS

Office Action, U.S. Appl. No. 11/555,639, dated Dec. 24, 2009.
1 Office Action, U.S. Appl. No. 11/954,722 dated Dec. 23, 20010.

* cited by examiner

*Primary Examiner* — Abderrahim Merouan
(74) *Attorney, Agent, or Firm* — Patterson & Sheridan, LLP

(57) ABSTRACT

Sequential write operations to a unit of compressed memory, known as a compression tile, are examined to see if the same compression tile is being written. If the same compression tile is being written, the sequential write operations are coalesced into a single write operation and the entire compression tile is overwritten with the new data. Coalescing multiple write operations into a single write operation improves performance, because it avoids the read-modify-write operations that would otherwise be needed.

15 Claims, 4 Drawing Sheets

COALESCING TO AVOID READ-MODIFY-WRITE DURING COMPRESSED DATA OPERATIONS

CROSS-REFERENCE TO RELATED APPLICATIONS

This application is a divisional of U.S. patent application Ser. No. 11/555,639, filed Nov. 1, 2006, which is hereby incorporated herein by reference.

BACKGROUND OF THE INVENTION

1. Field of the Invention

Embodiments of the present invention relate generally to compressed data operations during graphics processing and more specifically to a system and method for avoiding read-modify-write performance penalties during compressed data operations.

2. Description of the Related Art

In graphics processing, compressed data is often employed for efficient memory usage. For example, the frame buffer of a graphics processing unit ("GPU") typically stores graphics data in compressed form to realize storage efficiencies. The unit of memory for data stored in the frame buffer is called a "tile" or a "compression tile." Compression tiles may store color data or depth data for a fixed number of pixels in compressed or uncompressed form.

FIG. 1 illustrates a GPU 102 including a pair of rendering pipelines. The first rendering pipeline is a depth raster operations pipeline ("ZROP") 106 and the second rendering pipeline is a color raster operations pipeline ("CROP") 108. CROP 108 is configured to handle data transfer operations from both pipelines to a frame buffer 110, which is normally implemented as a DRAM. The frame buffer 110 receives the data in blocks from CROP 108 and stores it in the form of tiles.

In some GPU architectures, the size of the blocks transferred by CROP 108 is smaller than the tile size. In these architectures, storing a block in the frame buffer 110 involves identifying a tile that corresponds to the block and updating that tile to include data from the block, while leaving all remaining data in the tile unchanged. For an uncompressed tile, modifying the tile in-memory can be done because the uncompressed format of the tile allows modifying a portion of the tile without disturbing the contents of the remainder of the tile. However, as is commonly known, modifying compressed tiles in-memory is very difficult because the dependent relationship among data stored in compressed format causes changes to one portion of the tile to disturb the remainder of the tile. Thus, for a compressed tile, updating the tile involves reading the contents of the tile from memory in the frame buffer 110, decompressing the tile contents within the frame buffer, modifying the uncompressed tile contents with the block of data to be written, compressing the modified tile, and storing the compressed, modified tile to memory in the frame buffer 110. This process is computationally very expensive because modern DRAMs are not able to change from read to write mode quickly and because the operation causes the frame buffer 110 to de-pipeline, i.e., stop streaming accesses.

SUMMARY OF THE INVENTION

The present invention provides an improved method and system for handling compressed data. According to embodiments of the present invention, sequential write operations to a compressible unit of memory, known as a compression tile, are examined to see if the same compression tile is being written. If the same compression tile is being written, the sequential write operations are coalesced into a single write operation and the entire compression tile is overwritten with the new data. Coalescing multiple write operations into a single write operation improves performance, because it avoids the read-modify-write operations that would otherwise be needed.

A processing unit according to an embodiment of the present invention includes a frame buffer having a plurality of compression tiles and a rendering pipeline that transfers a sequence of data blocks to be stored in the frame buffer in compressed form. The data blocks may comprise depth data for a plurality of pixels or color data for a plurality of pixels. The size of the data blocks is less than the size of the compression tiles, so that any single data block write operation on a compression tile requires the compressed data currently stored in the compression tile to be read, decompressed and modified using the single data block. The modified data is then compressed prior to being written into the compression tile. To avoid such read-modify-write operations, the frame buffer of the processing unit, according to an embodiment of the present invention, is configured to receive the sequence of data blocks from the rendering pipeline and determine if any multiple number of data blocks (e.g., 2) correspond to a single compression tile. If this condition is true, the multiple number of data blocks corresponding to a single compression tile are combined, compressed and stored in the single compression tile as part of a single, coalesced write operation to the frame buffer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
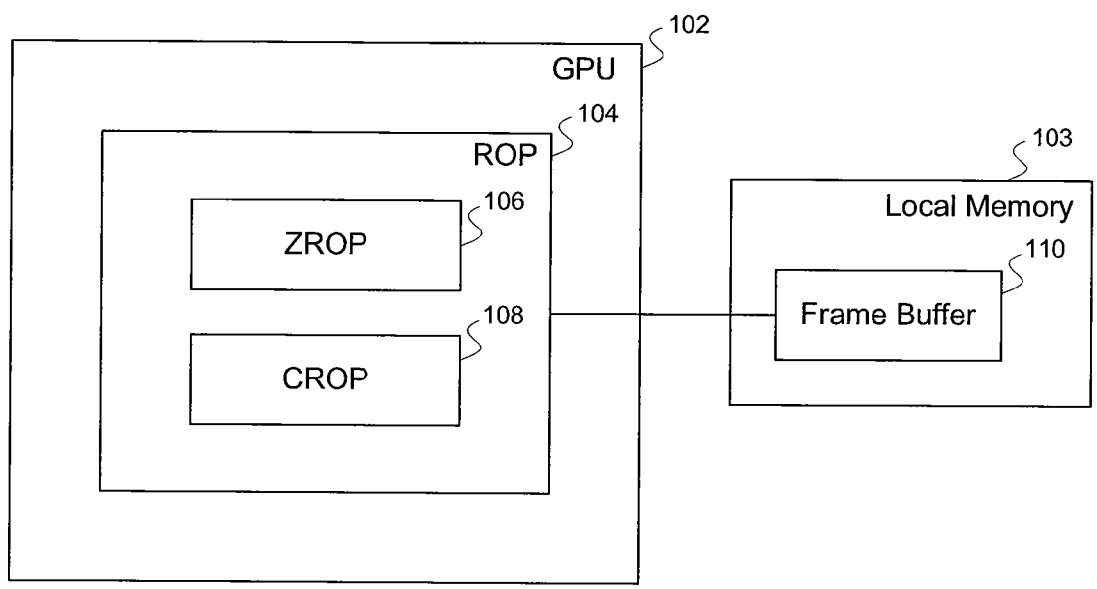
FIG. 1 illustrates a conventional GPU having a pair of ROP units.
Figure 2:
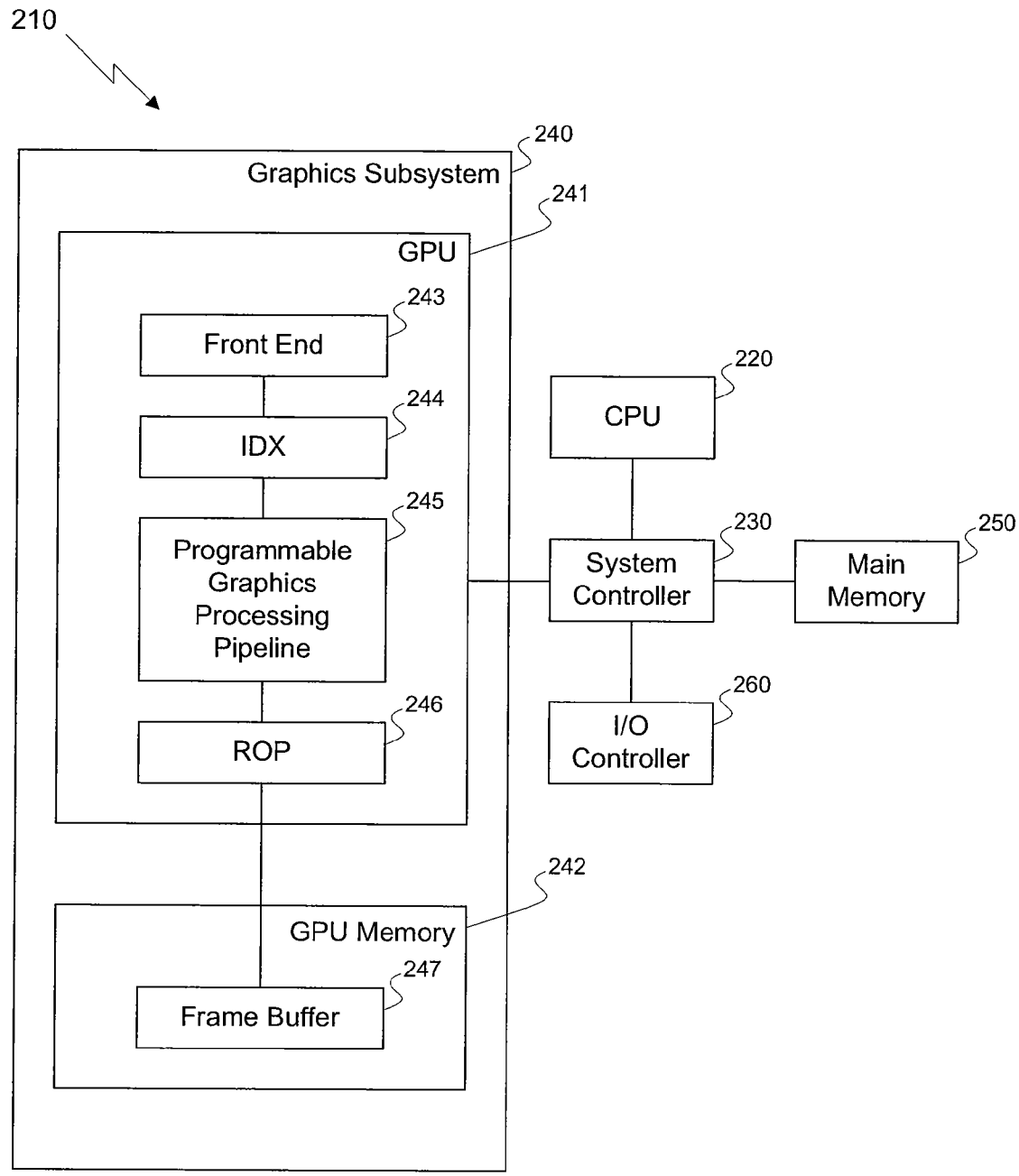
FIG. 2 illustrates a computing device in which embodiments of the present invention can be practiced.

FIG. 2 illustrates a computing device 210 in which embodiments of the present invention can be practiced. The computing device 210 includes a central processing unit (CPU) 220, a system controller hub 230 (sometimes referred to as a "northbridge"), a graphics subsystem 240, a main memory 250, and an input/output (I/O) controller hub 260 (sometimes referred to as a "southbridge") which is interfaced with a plurality of I/O devices (not shown), such as a network interface device, disk drives, USB devices, etc.

The graphics subsystem 240 includes a GPU 241 and a GPU memory 242. GPU 241 includes, among other components, front end 243 that receives commands from the CPU 220 through the system controller hub 230. Front end 243 interprets and formats the commands and outputs the formatted commands and data to an IDX (Index Processor) 244.

Some of the formatted commands are used by programmable graphics processing pipeline 245 to initiate processing of data by providing the location of program instructions or graphics data stored in memory, which may be GPU memory 242, main memory 250, or both. Results of programmable graphics processing pipeline 245 are passed to a ROP 246, which performs near and far plane clipping and raster operations, such as stencil, z test, and the like, and saves the results or the samples output by programmable graphics processing pipeline 245 in a render target, e.g., a frame buffer 247.

Figure 3:
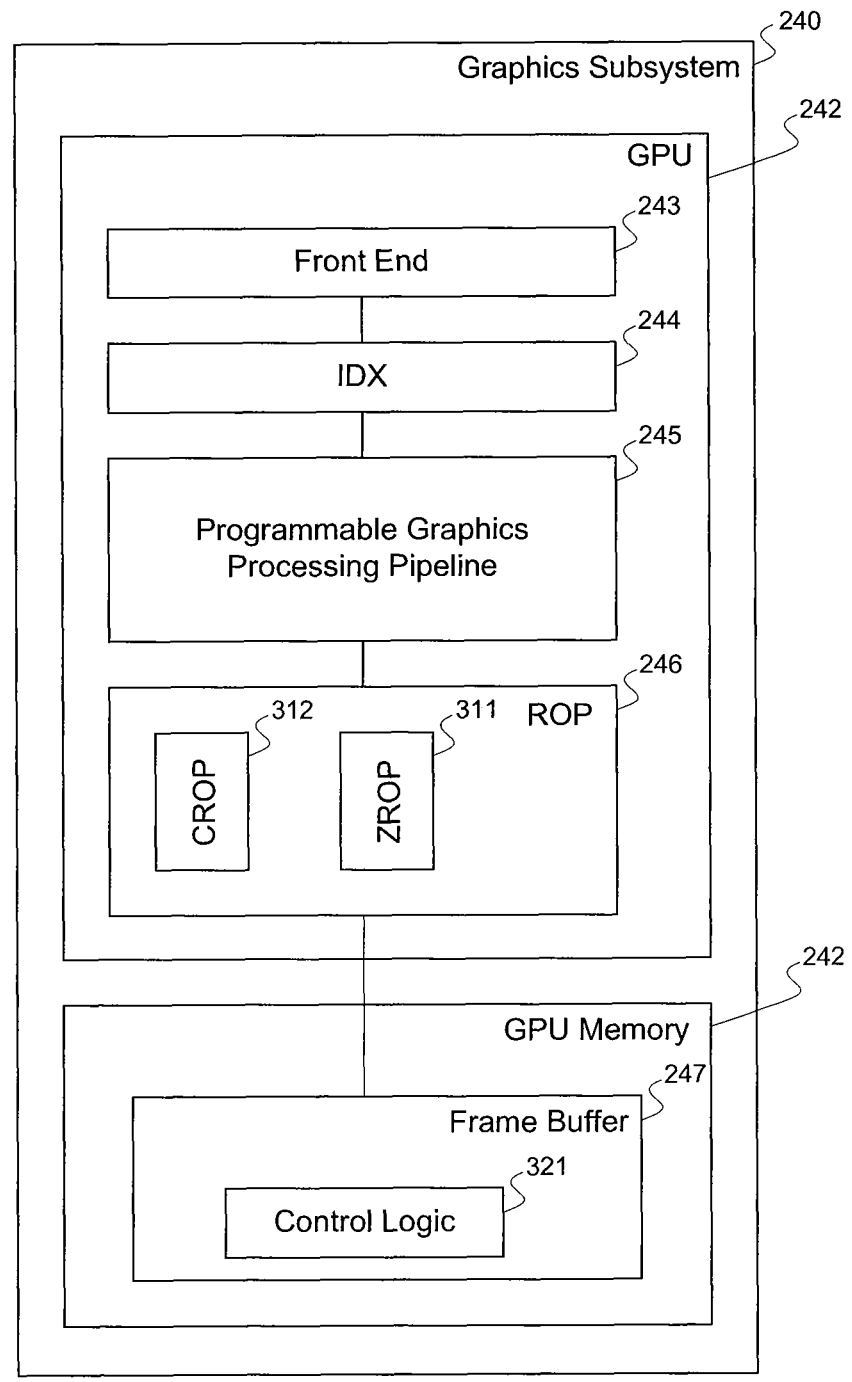
FIG. 3 illustrates certain elements of a graphics subsystem shown in FIG. 2 in additional detail.

FIG. 3 illustrates certain elements of the graphics subsystem 240 in additional detail. The ROP 246 is shown as having a ZROP 311 and a CROP 312, and the frame buffer 247 is shown as having control logic 321. CROP 312 is configured to handle block data transfer operations, from ZROP 311 to the frame buffer 247, which is implemented as a DRAM with control logic 321. The frame buffer 247 receives the data in fixed size blocks from CROP 312, combines the data blocks to form combined blocks, compresses the combined blocks if they are compressible, and stores the compressed and combined blocks as full compression tiles within the frame buffer. In the embodiments of the present invention illustrated herein, ZROP 311 is configured to generate depth data in blocks of 128 bytes and the corresponding depth data tile size is 256 bytes Thus, one depth data tile includes two depth data blocks.

Control logic 321 of the frame buffer 247 is configured to examine the blocks of data received from CROP 312 and control the timing of the writes to the tiles in the frame buffer 247. If two blocks of data received within a fixed number of cycles apart (e.g., _ cycles) are to be written to two halves of the same tile, the two write operations are coalesced into one write operation on the tile. The write operation includes combining the two data blocks, compressing the combined block and then writing the compressed and combined block onto the tile. The correct result is ensured to be written onto the tile using this method because every byte of the tile is being overwritten. With this method, a copy operation such as a blit operation that transfers data from a source (e.g., ZROP 311) to a destination (e.g., frame buffer 247), can be efficiently carried out, because the write data stream will consist of a sequence of data block pairs, wherein each data block pair has the same write destination tile. As a result, the frame buffer 247 can continue to stream and can avoid de-pipelining to accommodate read-modify-writes.

Figure 4:
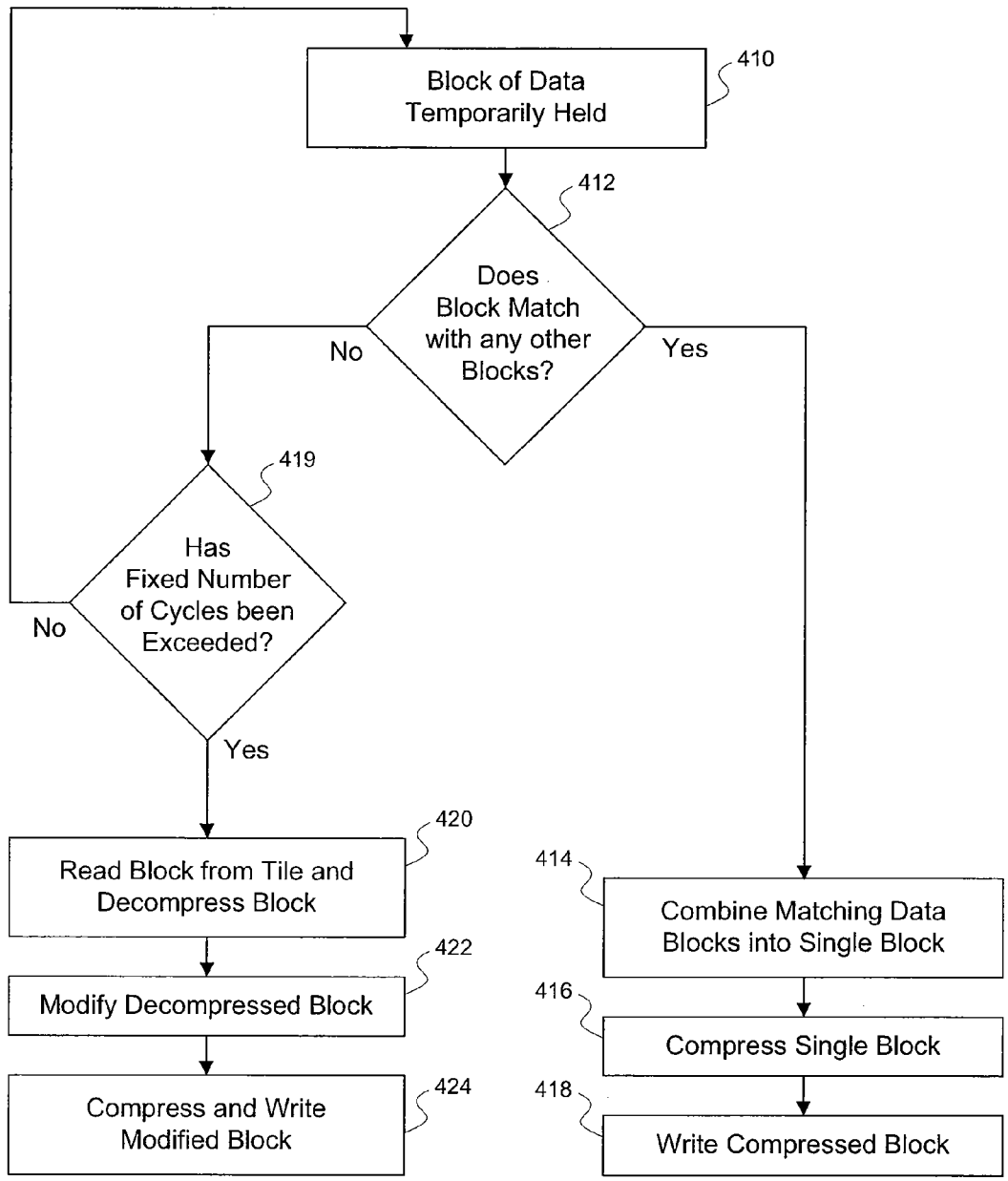
FIG. 4 is a flow diagram that illustrates the steps carried out during a write operation by a frame buffer shown in FIG. 2.

FIG. 4 is a flow diagram that illustrates the steps carried out by CROP 312 for each block of data received by it during a write operation. In step 410, the block of data is temporarily held in memory for a fixed number of cycles (e.g., _ cycles). The block of data is then examined for a match with another block of data, i.e., to see if it and another block of data are two halves of the same tile (step 412). If they are, the matching data blocks are combined into a single data block (step 414), and the single data block is compressed (step 416). In step 418, the compressed data is written into the tile.

If no match is found in step 412, a check is made to see if the fixed number of cycles has elapsed (step 419). It the fixed number of cycles has not elapsed, the flow returns to step 410 and the block of data continues to be held in memory until either a match is found (step 412) or the fixed number of cycles has elapsed (step 419). When the fixed number of cycles has elapsed, the block of data is written into the tile according to steps 420, 422 and 424. In step 420, the compressed data currently stored in the tile is read from the frame buffer 247 and decompressed by the CROP 312. In step 422, the decompressed data is modified with the block of data. In step 424, the modified decompressed data is compressed and the compressed data is written in the tile.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

What is claimed is:

1. In a graphics processing unit having a frame buffer, a color raster operations pipeline and a depth raster operations pipeline, a method for writing output data of the depth raster operations pipeline using the color raster operations pipeline and the frame buffer, said method comprising the steps of:
    transmitting first output data of the depth raster operations pipeline to the frame buffer using the color raster operations pipeline;
    receiving the first output data of the depth raster operations pipeline at the frame buffer;
    temporarily storing the first output data of the depth raster operations pipeline;
    transmitting second output data of the depth raster operations pipeline to the frame buffer using the color raster operations pipeline;
    receiving the second output data of the depth raster operations pipeline at the frame buffer;
    determining that the first output data and the second output data are two halves of a tile;
    combining the temporarily stored first output data and the second output data into a single coalesced write operation without first reading the tile from the frame buffer; and
    writing the combined data to the tile in the frame buffer.

2. The method according to claim 1, further comprising the step of compressing the combined data, wherein the combined data is written in the frame buffer in compressed form.

3. The method according to claim 1, further comprising the steps of:
    transmitting third output data of the depth raster operations pipeline to the frame buffer using the color raster operations pipeline;
    receiving the third output data of the depth raster operations pipeline at the frame buffer;
    reading compressed data from the frame buffer;
    decompressing the compressed data;
    modifying the decompressed compressed data using the third output data;
    compressing the decompressed compressed data as modified to produce new compressed data; and
    writing the new compressed data in the frame buffer.

4. The method according to claim 3, wherein the new compressed data is written into the same memory location as the memory location of the compressed data.

5. The method according to claim 3, further comprising the step of determining that the third output data is not to be combined with any other output data of the depth raster operations pipeline.

6. The method according to claim 5, further comprising the step of determining that the first output data is to be combined with the second output data.

7. The method according to claim 3, further comprising, before reading the frame buffer:
    transmitting fourth output data of the depth raster operations pipeline to the frame buffer using the color raster operations pipeline; and receiving the fourth output data of the depth raster operations pipeline at the frame buffer.

8. The method according to claim 7, further comprising:
determining that a fixed number of cycles has not elapsed between receiving the third output data and receiving the fourth output data; and
determining that the third output data and the fourth output data are not two halves of an additional tile.

9. The method according to claim 7, wherein the third output data and the fourth output data are two halves of an additional tile, and further comprising, before reading compressed data from the frame buffer, determining that the fixed number of cycles has elapsed between receiving the third output data and receiving the fourth output data.

10. The method according to claim 1, wherein the first and second output data comprise depth data for a plurality of pixels.

11. The method according to claim 1, wherein the first and second output data comprise color data for a plurality of pixels.

12. The method according to claim 1, further comprising the step of determining that a multiple number of first output data received at the frame buffer corresponds to a single compression tile.

13. The method according to claim 12, wherein the multiple number is two.

14. The method according to claim 1, wherein the first and second output data are transmitted from the depth raster operations pipeline to the frame buffer to carry out a blit operation.

15. The method according to claim 1, wherein a sequence of data block pairs, including the first and second output data, are transmitted in sequence from the depth raster operations pipeline to the frame buffer to carry out a blit operation.

* * * * *